(12) United States Patent
Brandsæter

(10) Patent No.: US 7,020,045 B2
(45) Date of Patent: Mar. 28, 2006

(54) BLOCK AND MODULE FOR SEISMIC SOURCES AND SENSORS

(75) Inventor: Helge Brandsæter, Stabekk (NO)

(73) Assignee: Read ASA, Nesbru (NO)

( * ) Notice: Subject to any disclaimer, the term of this patent is extended or adjusted under 35 U.S.C. 154(b) by 259 days.

(21) Appl. No.: 10/271,762

(22) Filed: Oct. 17, 2002

(65) Prior Publication Data

US 2003/0117895 A1  Jun. 26, 2003

(30) Foreign Application Priority Data

Oct. 17, 2001  (NO)  ................................ 015052
Oct. 17, 2002  (NO)  ................................ 025010

(51) Int. Cl.
*G01V 1/40*  (2006.01)

(52) U.S. Cl. .................... 367/31; 367/25; 367/188; 181/102

(58) Field of Classification Search ............... 367/31, 367/81, 188, 25, 911; 324/67, 68; 181/102
See application file for complete search history.

(56) References Cited

U.S. PATENT DOCUMENTS

| | | | |
|---|---|---|---|
| 4,557,326 A * | 12/1985 | Bogard ........................ 166/212 |
| 4,987,969 A | 1/1991 | Boyle et al. ................. 181/102 |
| 5,044,460 A * | 9/1991 | Kamata et al. .............. 181/102 |
| 5,146,050 A * | 9/1992 | Strozeski et al. ........... 181/102 |
| 5,200,581 A | 4/1993 | Boyle et al. ................. 181/102 |
| 5,302,782 A * | 4/1994 | Owen .......................... 181/122 |
| 5,318,129 A | 6/1994 | Wittrisch .................... 166/336 |
| 5,730,219 A | 3/1998 | Tubel et al. ............. 66/250.01 |
| 6,006,855 A * | 12/1999 | Howlett ....................... 181/102 |
| 6,049,508 A | 4/2000 | Deflandre .................... 367/48 |
| 6,131,658 A | 10/2000 | Milner ................... 166/250.01 |
| 6,173,804 B1 * | 1/2001 | Meynier ...................... 181/102 |
| 6,568,501 B1 * | 5/2003 | Paulsson ...................... 181/102 |
| 2001/0040052 A1 * | 11/2001 | Bourgoyne et al. ............ 175/7 |

FOREIGN PATENT DOCUMENTS

GB  2 356 209 A  5/2001
NO  20015052  * 10/2001

* cited by examiner

*Primary Examiner*—Jack Keith
*Assistant Examiner*—Scott A. Hughes
(74) *Attorney, Agent, or Firm*—Finnegan, Henderson, Farabow, Garrett & Dunner, L.L.P.

(57) ABSTRACT

The invention relates to a source block with a downhole seismic source for use in seismic acquisition during production, comprising:
a device for locking the block in a first position spaced from the well casing,
a device for releasing the locking device,
a device for urging the source block against the casing.

Figure 1:
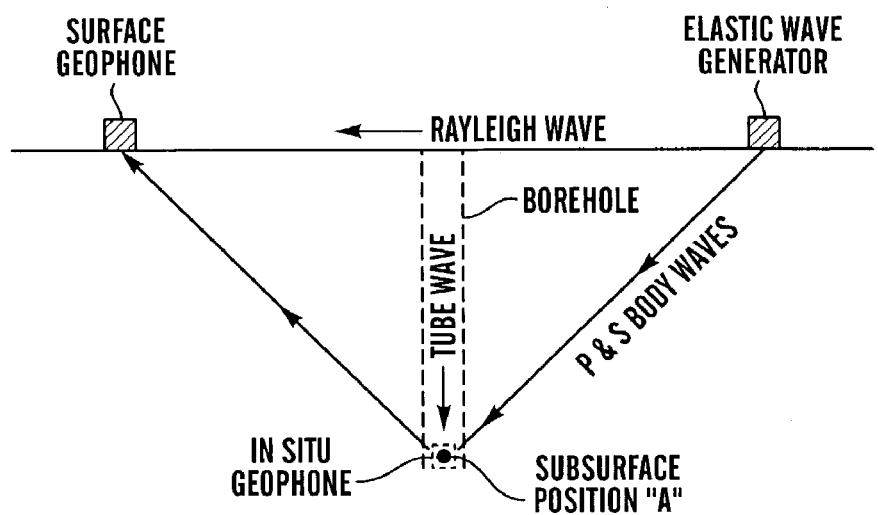

The source block is characterized by comprising, a fluid circuit for controlling the operation of the locking and releasing devices, this fluid circuit comprising a rupture disc.

12 Claims, 10 Drawing Sheets

BLOCK AND MODULE FOR SEISMIC SOURCES AND SENSORS

The present invention is related to down-hole seismic acquisition devices, that is seismic sources and sensor devices and more precisely to tubing conveyed sources and sensors comprising a block and a module for generating and receiving signals for borehole seismic acquisition during production.

The objective of the invention is to provide a system with permanently installed down-hole source devices and sensor devices for use in acquisition of seismic data.

Well access for measurements in producing wells is limited due to costs and limitations set forward by the well completion itself. The purpose of this invention is to provide a system which can provide continuous seismic measurement without impacting production in the well. By configuring the devices in so-called tubing conveyed configuration this effect is achieved.

In this description the expression "down-hole seismic acquisition devices" will be used to refer to acoustic sources and also to sensors.

The objective of the invention is to provide a system with permanently installed down-hole seismic acquisition devices for use in acquisition of seismic data.

Despite of large developments in surface seismic technology, the resolution in seismic data is still limited. Considering targets at 2–3000 m, the upper frequency is normally less than 50 Hz and still little or nothing can be done to extend this limit upwards. The main limitation is earth attenuation in the travel path for the seismic waves. To increase the resolution, the effect of attenuation must be reduced, by e.g. moving closer to the target.

The combination of down-hole sources and down-hole geophones/accelerometers (sensors) is considered the best solution for high resolution imaging away from the well bore. Down-hole acoustic sources can be deployed either in connection with wireline operated borehole seismic surveys, during drilling or they can be permanently deployed.

a) Down-Hole Sources.

They are today used in different geometric configurations of seismic surveys:

Reverse Vertical Seismic Profiling (VSP):

Reverse VSP implies having receivers on the surface, in contrast with standard VSP. In standard VSP a large number of surface sources are combined with down-hole receivers. The use of surface receivers in reverse VSP instead of surface sources will reduce crew time and drill rig time. A powerful down-hole source will be necessary to achieve the necessary signal to noise ratio for deep targets.

Several large programs have been carried out to include an acoustic source in the drill string for reverse VSP. For example the Marconi/Sperry Ladar, the IKU Poslog etc. These programs have not provided satisfactory devices with respect to signal/noise ratio and processing of acquired data with inclusion of sources in the drill collar.

Cross-Well:

Cross-well reflection imaging is performed using sources at the same depth in at least two wells in close proximity and implies separating direct and reflected wave-fields. Since reflections may originate above or below the source and receive depths, energy propagating upwards and downwards must also be separated. After separation, the reflected wavefields may be processed using standard VSP methods.

Single Well:

In some areas like the North Sea, the number and spacing of well makes cross-well studies almost impossible. For these areas single well surveys are the only available method. In single well surveys, the source and the receivers are deployed in the same well. The main purpose is to obtain shear velocity at seismic frequencies a.o. The current available sources have not been matched with appropriate receiver systems. The receiver systems have up to now not provided adequate sampling of the wave-field, i.e. the VSP receiver system does not include sufficient number of satellites for proper spatial and temporal sampling.

The main challenge regarding down-hole sources is the presence of tube waves. Wave propagation involved in surface reflection seismology is shown in FIG. 1. The purpose of vertical seismic profiling is to implant a geophone at depth and record seismic wavefields in the interior of the earth rather than at the surface. This concept is shown in FIG. 1. Rayleigh and Love waves travelling along the surface of the earth do not interfere with the recording of body wave events by the deeply buried geophone used in this type of recording geometry.

Unfortunately, the fluid filled borehole by which one gains access to the earth's interior introduces a cylindrical discontinuity which serves as a medium for propagating undesirable interfacial waves, just as does the planar earth-air interface involved in surface recordings. These fluid-borne borehole wave modes are commonly called tube waves. Thus in the seismic recording of elastic body wave behaviour in the earth, one must contend with the problem of some type of unwanted interfacial wave mode, irrespective of geophone location. Surface geophones are affected by Rayleigh and Love waves, and borehole geophones are influenced by tube waves.

Tube waves are one of the most damaging types of noise that can exist in vertical seismic profiling because they represent a coherent noise that repeats itself for every seismic shot. Repeating seismic shots and summing several geophone responses into a single, composite record can reduce random seismic noise. Summing repeated shots cannot reduce coherent tube wave noise; in fact, it is usually amplified since its waveform character is consistent for all records being summed. The ability to provide high quality imaging data is limited by signal/noise ratio in the acquired data, and the main noise source is most often tube waves. The borehole comprises a nearly perfect wave guide and different noise modes may influence data quality severely.

In Vertical Seismic Profiling (VSP) using a surface acoustic source and down-hole receivers, these noises usually are reduced by application of formation coupling techniques so that the sensor nodes are clamped to the borehole wall, thereby reducing the influence of tube waves.

When the acoustic source is placed in the borehole, the noise influence is more severe, since the source interacts directly with the "waveguide". The tube wave to body wave ratio may in worst case be in excess of 99%.

The object of the invention is thus to provide a tubing conveyed down-hole source comprising a block and a module for providing seismic waves for down-hole seismic exploration which do lead to low noise present in the emitted signal.

b) Down-Hole Sensors

Today the borehole seismic is acquired after or during drilling of the borehole and before completion. An example of equipment used in this kind of wire-line seismic acquisition is to be found in U.S. Pat. No. 5,044,460. This publication describes a down-hole seismic exploration device comprising a seismic detector such as a geophone and a magnetic clamp, which can be secured to a cable linking several such devices into an array. The array is lowered into a cased borehole and the magnetic clamps are operated to clamp the devices temporarily to the casing. When the exploration is finished, the array is lifted out of the borehole and the production piping can be put in place. As it will be obvious this equipment does not permit monitoring of the borehole in the production phase.

After the well has been completed it is difficult to perform full bore-hole surveys due to the presence of production tubing in the well.

One possibility for seismic acquisition in a well during production is placing the acquisition equipment inside the production piping as is the case with wire-line devices. This leads however to low sensor response, as the signals are received after being transmitted through the casing and the production pipe (formation coupling). Production must be interrupted during the seismic acquisition and this is undesirable as it leads to losses in operation time.

U.S. Pat. No. 5,730,219 describes a down-hole control system for a production well associated with permanent down-hole formation evaluation sensors which remain down-hole throughout production operations. The sensors are placed between the casing and the production pipe. This system is focused on controlling the different sensors in the well; it describes a so called intelligent completion.

Other devices containing permanent magnets for apposing sensors to pipe walls are prior art. These known devices are placed on the production pipe, and have thus the same disadvantages as wire-line devices. A characteristic of the devices that operate inside the production pipe is that they do not need to comply with requirements regarding reduced space, that is, these prior art modules can be quite large as there is large available space in the production pipe.

If the aim is to place a module between the production pipe and the casing, that is, in the annulus then the module has to be adapted to small dimensions. Generally the distance between production pipe and annulus is between 25.4 mm and 50.8 mm (1"–2").

A known system adapted for placement in the annulus comprises a tubular probe comprising geophone sensors. The sensors are mounted on a spring blade that presses them against the casing walls. This system includes a rubber ring between the sensors and the production tubing in an attempt to avoid formation coupling. This system has to be tailored to the different casing/tubing sizes. The main disadvantage of this rubber-and-spring system is that it does not provide sufficient decoupling from the production pipe.

It is therefore an object of the present invention to provide a tubing conveyed seismic acquisition sensor comprising a block and module that can be used irrespective of the annulus characteristics, that does not require any electrical active elements placed in the annulus, that is small and robust, and that provides seismic acquisition by direct contact with the casing.

c) The Invention

The object of the invention is to provide a tubing conveyed, down-hole seismic acquisition device comprising a block and a module for providing and/or receiving seismic waves for down-hole seismic exploration which do lead to low noise present in the emitted signal.

The tubing conveyed seismic acquisition device according to the invention comprises a module for placement between a well casing and a production pipe, wherein the module comprises a block equipped with acoustic transducer dishes and/or seismic sensors and clamping devices for clamping the block against the well casing.

In a preferred embodiment the block comprises:
a device for locking the block to the module in a first position where the block's surface is in flush with the module's surface,
a device for releasing the locking device,
a device for clamping the source block against the casing, and
a fluid circuit for controlling the operation of the locking and releasing devices, this fluid circuit comprising a rupture disc.

The fluid circuit in one embodiment of the invention comprises:
a first chamber containing a fluid under pressure,
a second chamber containing a fluid under a lower pressure, said rupture disc being arranged between the chambers,
the first chamber being connected to the locking device for controlling its position as a function of the fluid pressure in said first chamber,
the first chamber being also connected to the release device, this device controlling fluid supply and thus pressure in the first chamber,
the release device being adapted to increase pressure in the first chamber until rupture of the rupture disc, which causes the release of the locking device.

The clamping device can comprise at least one permanent magnet arranged on the block's surface facing the casing and/or at least one spring device arranged on the block's surface facing the production pipe and/or at least one permanent magnet arranged on the block's surface facing the production pipe for cooperation with a repellent permanent magnet arranged on the source module.

The clamping devices are adapted to force the block against the casing.

The acquisition device according to the invention is adapted for arrangement between a production pipe and a casing and thus these elements are used to identify the opposite surfaces of the block and the module. The expression "facing the casing" will thus identify a convex surface, which is directed towards the casing in use as an opposite to the expression "facing the production pipe" which identifies the corresponding concave surface.

In a preferred embodiment of the invention the locking device in the block comprises locking pins for cooperation with sockets in the source module.

The invention can also be equipped with spacers or points arranged on the surface of the block adapted for apposition against the casing. Although the block according to the invention is designed for permanent attachment to the casing wall, it is advantageous to adapt it for easy removal from the annulus. The block is designed so the annulus cross-section is not blocked and well fluids can pass freely. The block is further provided with spacers arranged on the surface of the block facing the casing. The spacers have frustoconical or pyramidal shape or at least slanting parts that do not permit accumulation of materials and thus undesirable locking of the source module. In a preferred embodiment of the invention the spacers are arranged between the magnets in the block and the casing.

In an embodiment of the invention the acquisition device comprises also at least one geophone and at least one accelerometer.

The desired acoustic output will determine the number and size of the sources arranged on the module. The source module and the sensor module are meant mainly for stationary use and thus if data from several depths in the well are desired it will be advisable to set together several modules.

Depending on which sensors that are arranged on the block, a sensor module will preferably have one to three such blocks.

The permanent magnets can be arranged on the block's surface facing the casing, or in the block's surface facing the production pipe, while the springs are preferably arranged on the block's surface facing the production pipe. The block is locked by the locking device in a substantially non-protruding position relative to the source module (which is arranged separated from the casing) until the release device is activated and the rupture disc is broken. The release device is activated e.g. by applying a fluid pressure to a piston by means of a compressor arranged on the surface. When this happens the locking means are released and the source block is free to move towards the casing wall forced by the clamping means.

The function of the rupture disc will now be explained with reference to the above mentioned embodiment of the invention. In said preferred embodiment of the invention, the block includes a first chamber containing a fluid under pressure (higher pressure) and a second chamber containing a fluid at a lower pressure (preferably atmospheric pressure). The rupture disc is placed between the first and second chambers and withstands the pressure difference. The pressure difference between the chambers is maintained as long as the rupture disc is intact. The pressure in the first chamber is converted to a force in the locking devices and these hold the block in place as long as this pressure is sufficiently high. In the preferred embodiment of the invention where the locking devices comprise locking pins, the pressure in the first chamber is converted into a force on the locking pins that keeps them projecting from the block. The block itself is held in a non-protruding position in relation to the sensor module (that is a position where there is no contact with the casing) by the locking pins.

In this state, the module containing at least one block is lowered into the annulus. When the correct depth in the annulus is attained, the release means are triggered by increasing the pressure difference between the chambers (this is preferably done by increasing pressure in the first chamber, e.g. by injecting more fluid in this chamber) until the rupture disc collapses. This causes a sudden pressure drop in the first chamber and thus a drop and a change of direction in the force exerted on the projecting locking means. As a consequence the locking pins are moved into the block and out of the sockets in the sensor module, and the block is free to move towards the casing.

When the locking means are released, the permanent magnets in the block will be attracted towards the casing wall, and since they are fastened to the block, the block will also move towards the casing wall and apposed to it.

The seismic acquisition module comprises as mentioned earlier a locking device for cooperation with the locking device in the block, and in a preferred embodiment of the invention the block locking device is implemented as locking pins and the module's locking device is implemented as sockets for receiving said locking pins.

In one embodiment of the invention, the acoustic source comprises an array of source elements mounted on a bar forming a reaction mass. The source elements are in an embodiment of the invention transducer dishes. The transducer dishes are preferably produced from Torfenol-D which is more efficient even at low frequencies than competing piezomaterials. In order to make the source as effective as possible, the reaction mass must be as large as possible within the available space between the production tubing and the casing. The reaction mass can be made of tungsten.

In one embodiment, the transducer dishes are mounted in the axial well direction on transducer bars. The number of transducers and size/weight of the reaction mass can be adapted to the desired acoustic input.

Alternatively the source may be configured as a radial dipole by configuring a symmetric system with two bars comprising source elements acting on opposing borehole walls by extending the reaction mass to form a cylinder with an elliptical cross section.

The source can be operated either in impulse mode or sweeping mode. In the impulse mode, the controlling signal is an electric impulse giving a sharp well defined pulse. In impulse mode the signal energy will be limited.

The most common mode of application will be in sweeping mode; that is in sweeping mode as applied in standard surface-seismic vibratory sources. In this mode the total acoustic energy level can be increased and the frequency band can be selected/controlled. The control signal is represented by an increasing frequency sinusoidal shape.

In a preferred embodiment of this source module, it is equipped with two source blocks for performing measurements in two directions.

The sensor module according to the invention permits seismic acquisition directly from the casing wall, and also reduces the influence of the vibration in the production tube in the measured values to a minimum, since there is no mechanical coupling transmitting vibrations between the sensor block and the module. This last aspect of the invention is specially advantageous in a preferred embodiment of the invention, where the sensor block comprises a hydrophone for measuring static pressure, which hydrophone must not be mechanically coupled to the production tubing. In said preferred embodiment of the invention the sensor block comprises one accelerometer to obtain velocity values by combining values of static pressure and acceleration. In a preferred embodiment of this sensor module, it is equipped with two sensor blocks for performing measurements in two directions and in some cases it will be advantageous to provide the sensor module with three such blocks. It is also possible to implement a sensor module with three sensor blocks containing one sensor in each block or a single sensor block equipped with three sensors.

A seismic acquisition device according to the invention offers several advantages. The permanent magnets used as holding means are reliable, have easy maintenance, and are free for active electric parts that could represent danger of explosion. The locking and releasing means implemented by a rupture ring ensure simple and reliable operation. The module can be implemented with small dimensions so that it can be readily fitted in the annulus.

It is also important that the module is as light as possible, since this will have a direct influence in the size of the permanent magnets.

By closely monitoring the changes in the seismic image acquired downhole one is able to monitor, for example how waterfronts are behaving over time and thereby optimise injection and recovery rates. A system according to the invention gives also possibilities to monitor how hydrocarbons migrate in the reservoir during production.

According to the invention, the sources and/or sensors are installed as an integral part of the well completion and thus production tubing will not represent a limitation to seismic acquisition.

As it is understood from the former description, the invention permits release of a holding device and thus aposition of the sensor block against the casing without downhole motors or electric signals from the surface. This results in a highly reliable system. A simple system is vital for downhole equipment.

Up to the introduction of this invention it has been difficult to access producing wells and perform acoustic measurements. The main reason being firstly that a producing well is comprised of at least two pipes with an annulus. In production mode measurement instruments can only access the inner pipe (production pipe).

Measurement devices placed in the inner pipe will not be adequately coupled to the outside geologic formations in order to supply sufficient quality in the measurements.

Secondly, measurements using wireline in the production pipe require the well to be closed down and production stopped. As can be understood, this process of closing down production has significant cost impacts. So a second advantage of the invention is that down-hole acoustic measurements can be carried out cost-effectively without intervention in other activities and oil production.

Thirdly, application of down-hole acoustic sources can supply a bridge between lower resolution VSP's using surface sources and detailed measurements provided by standard open-hole logging measurements.

Furthermore, the source in this invention is designed to minimize acoustic noises as tube waves.

By applying an acoustic source in this configuration, the measurement conditions will be constant and so called 4 D monitoring measurements can be performed in order to characterize any changes in the reservoir over time.

As it is understood from the former description, the invention permits release of a locking device and thus apposition of the source block against the casing without down-hole motors or electric signals from the surface. This results in a highly reliable system. A simple system is vital for down-hole equipment.

As mentioned above, the source and the sensor modules may comprise one or more source blocks. Additionally a module may be produced that comprises one or more sensor blocks in addition to the source block(s). The sensor block may be of a type described in the applicant's own patent application NO 20015052, or other suitable sensor block.

Single well surveys and other surveys requiring source and receiver mounted in the same well may also be performed using one or more source modules combined with one or more sensor modules.

Figure 2:
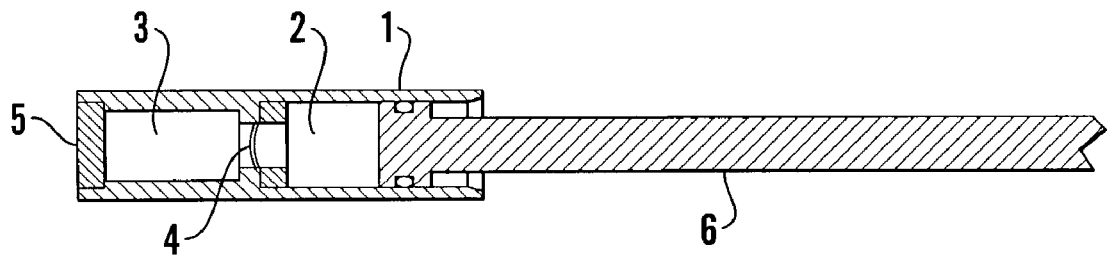
Figure 2:
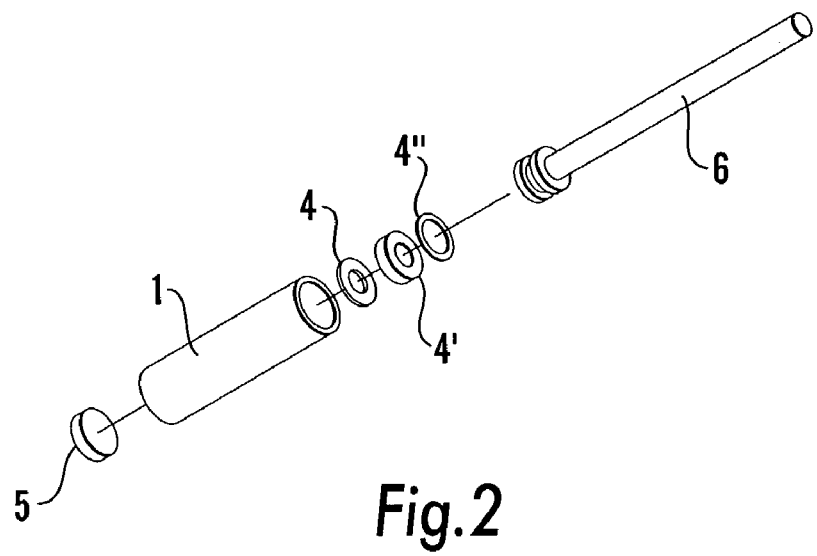
Figure 3A:
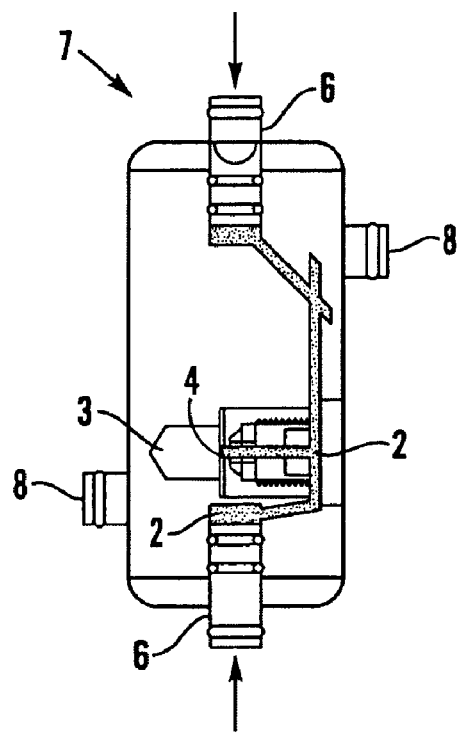
Figure 3B:
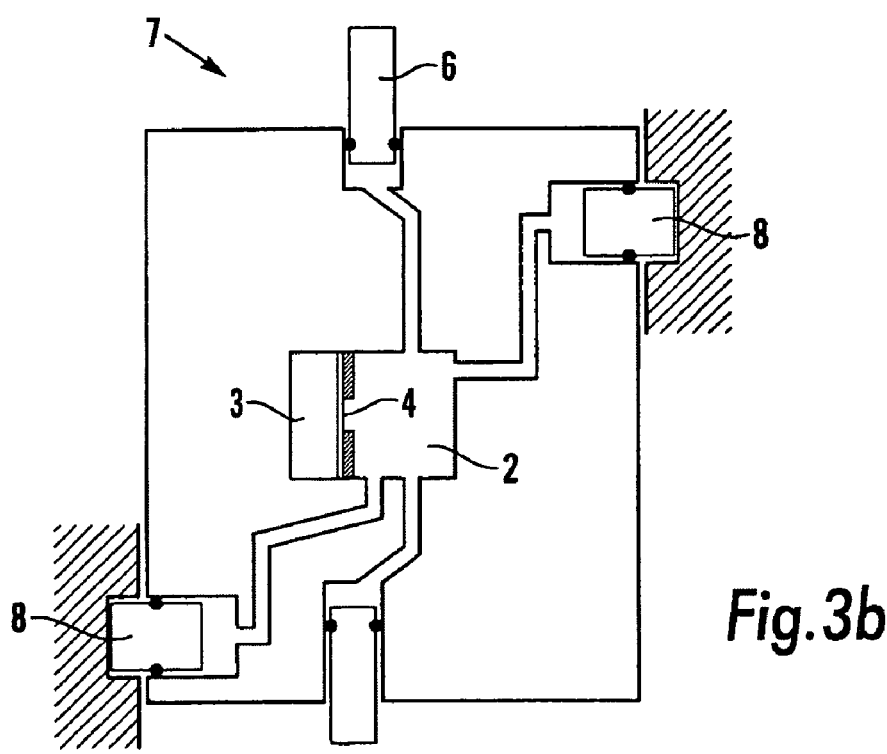
Figure 3C:
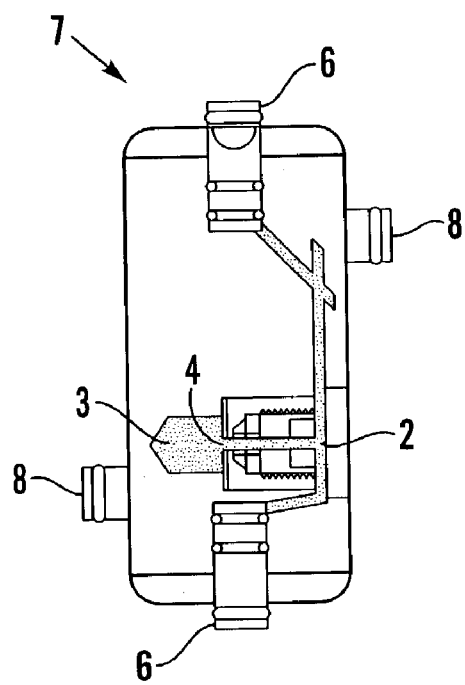
Figure 3D:
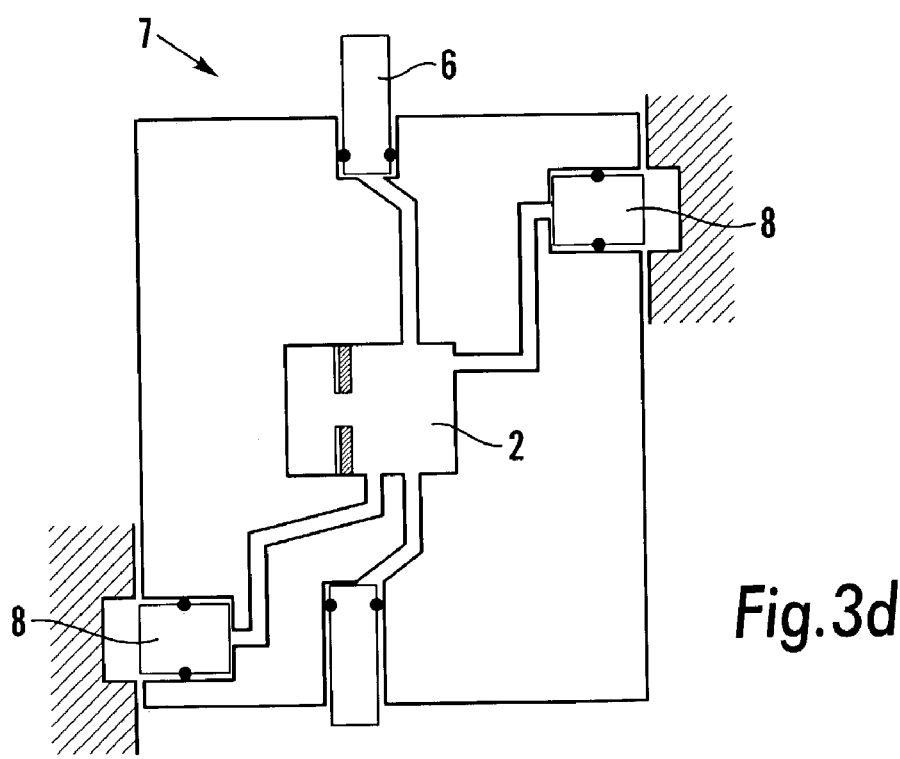
Figure 4:
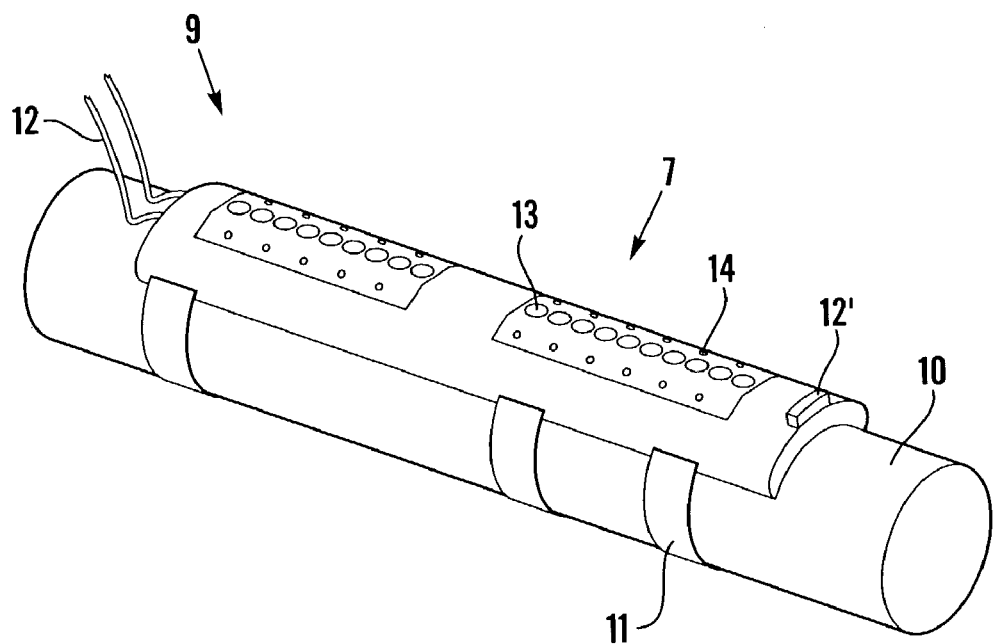
Figure 5:
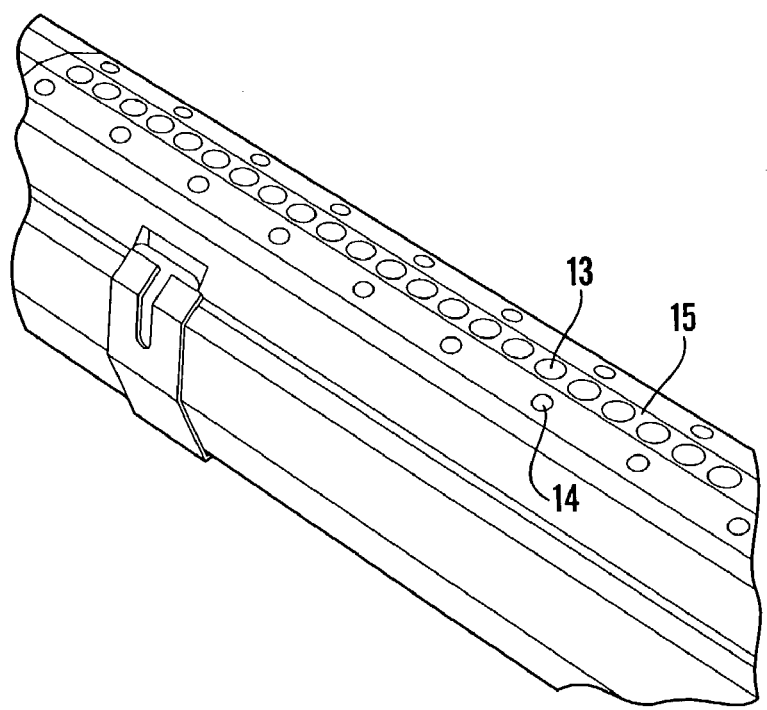
Figure 6:
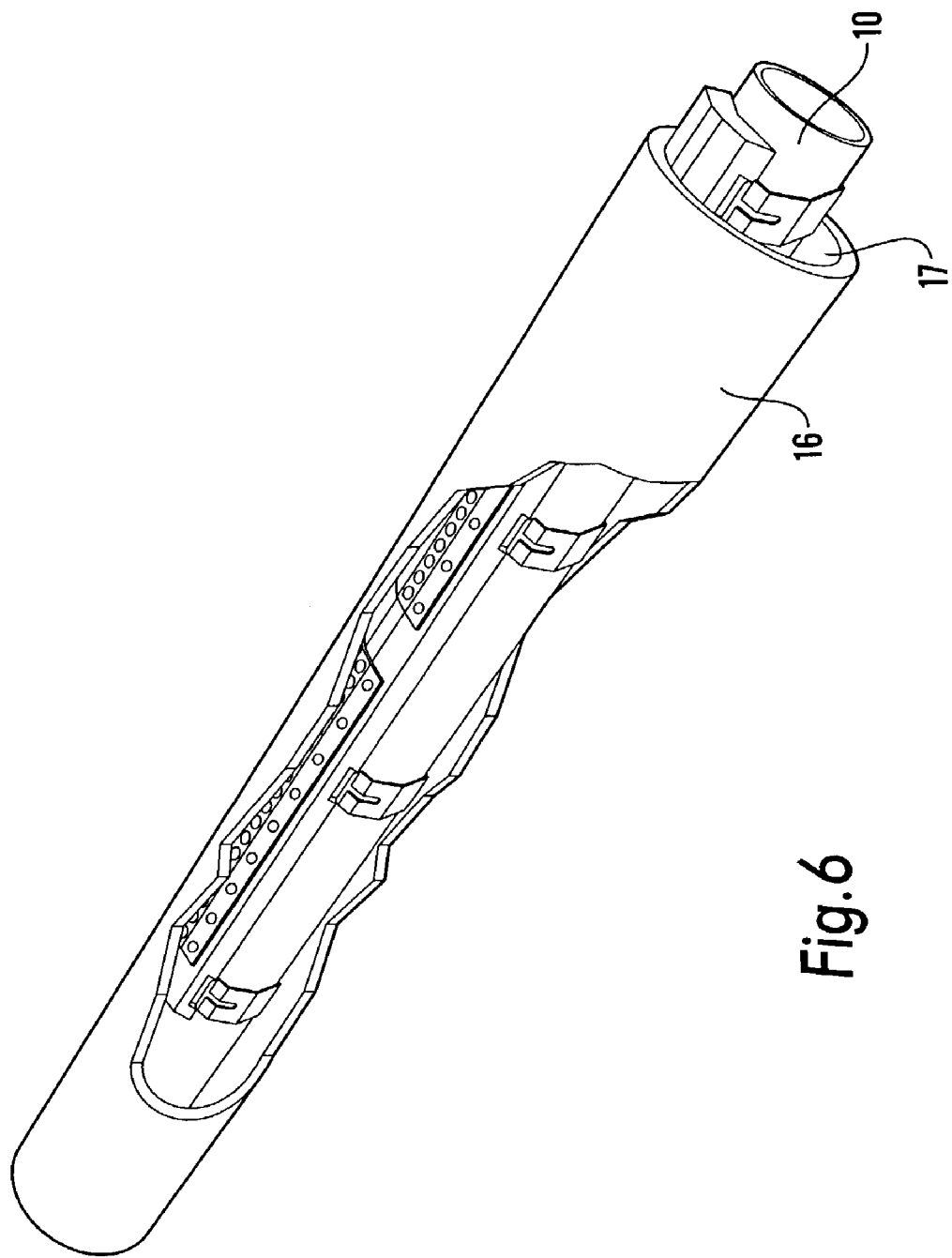
Figure 7:
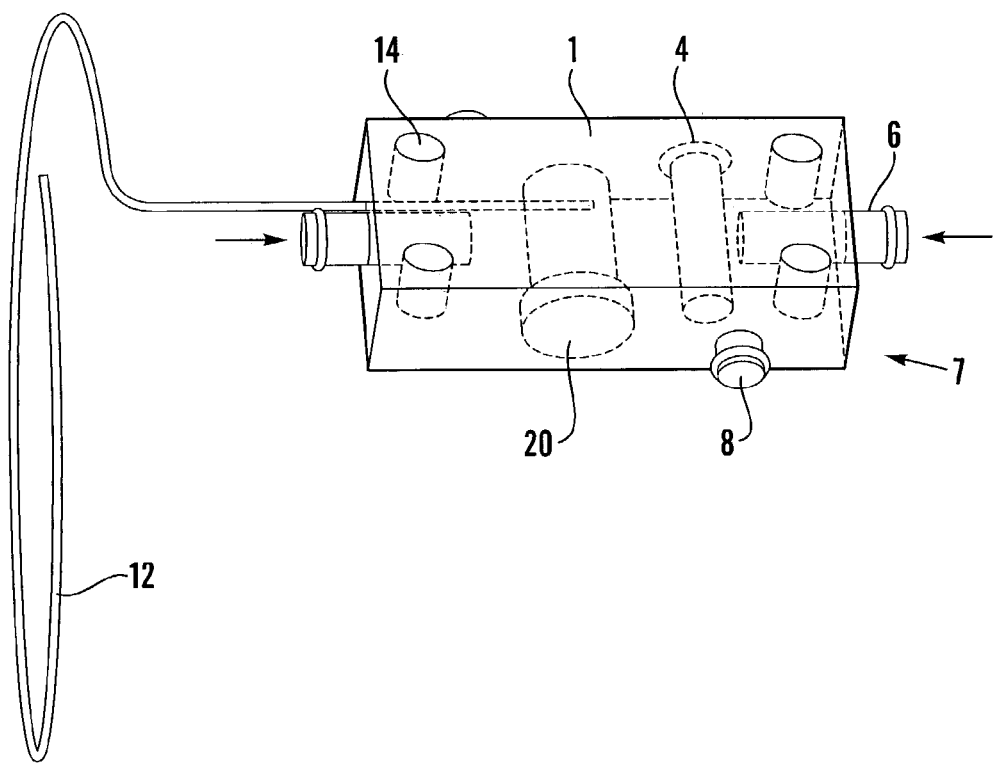
Figure 8:
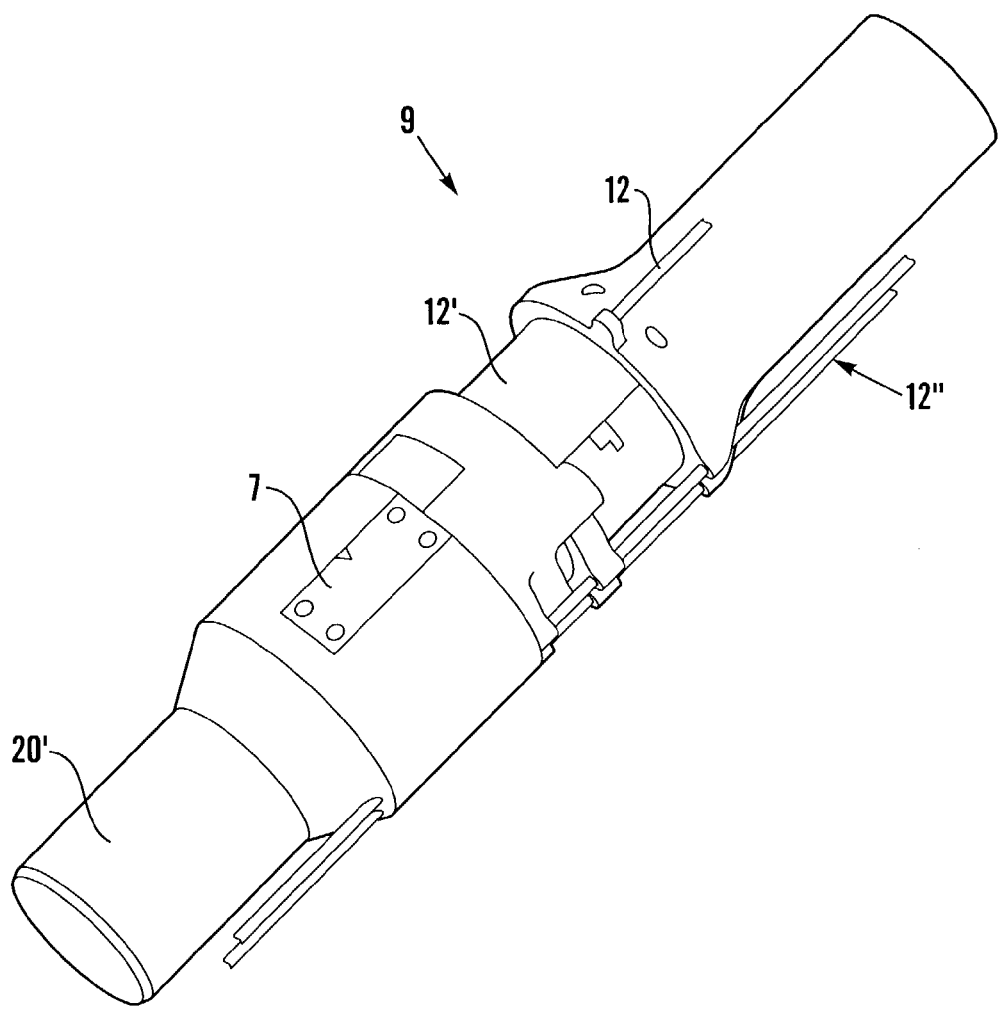
Figure 9:
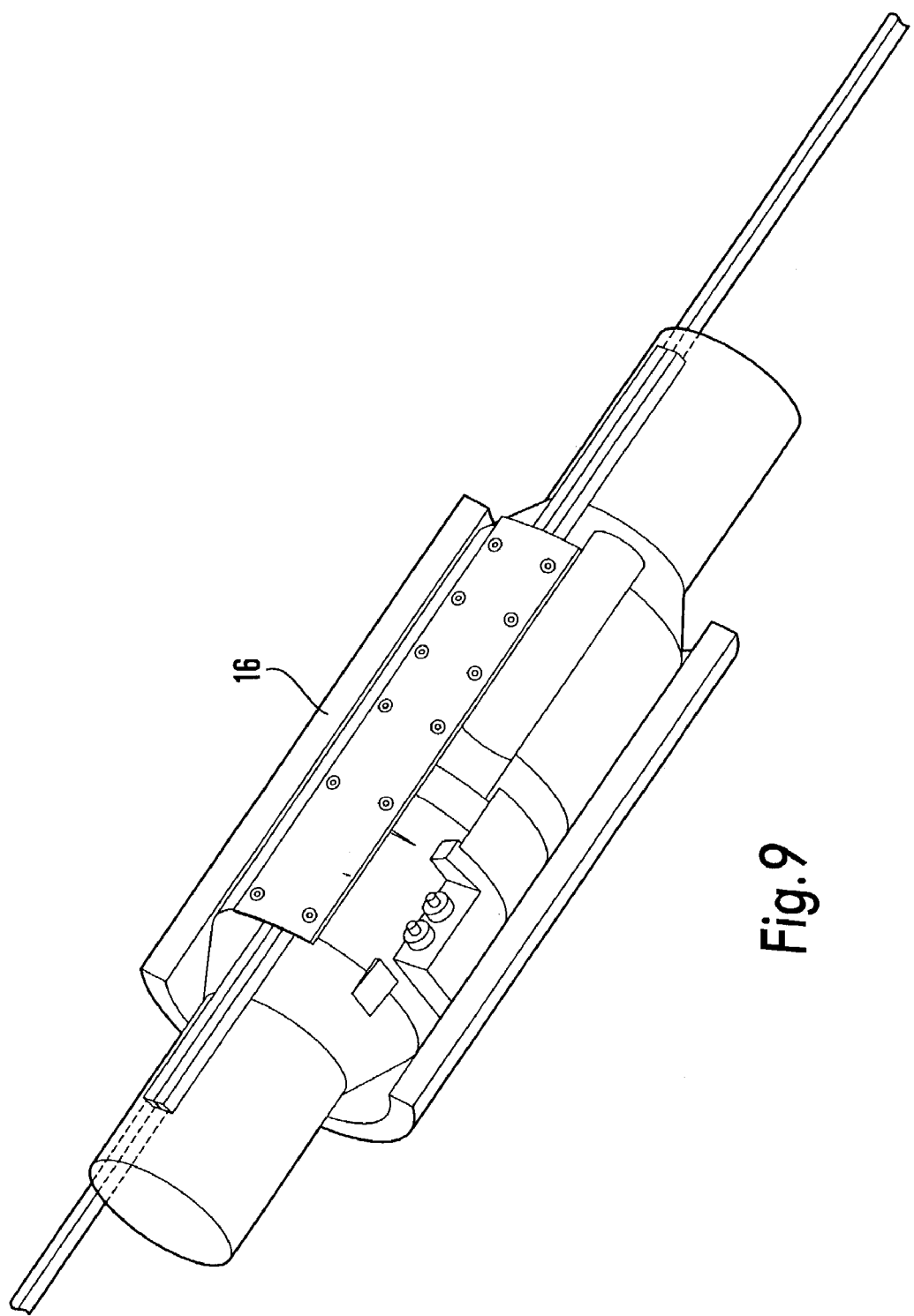
Figure 10:
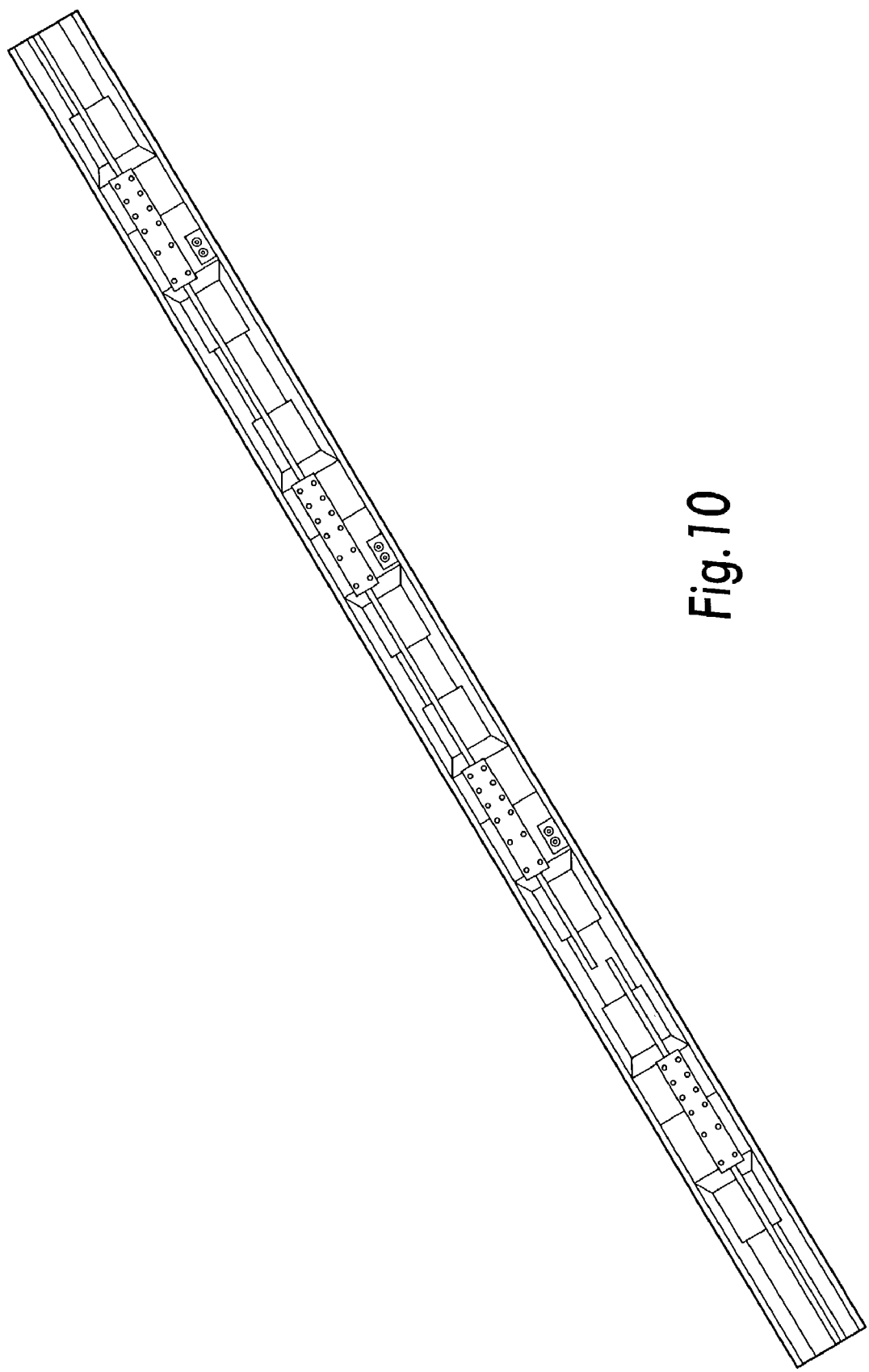
Figure 11:
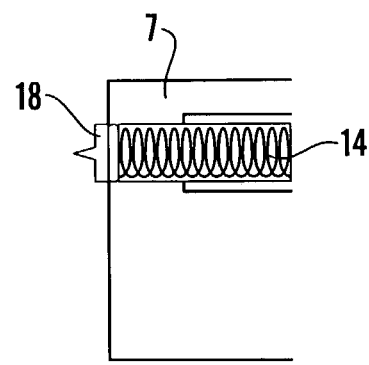
Figure 12A:
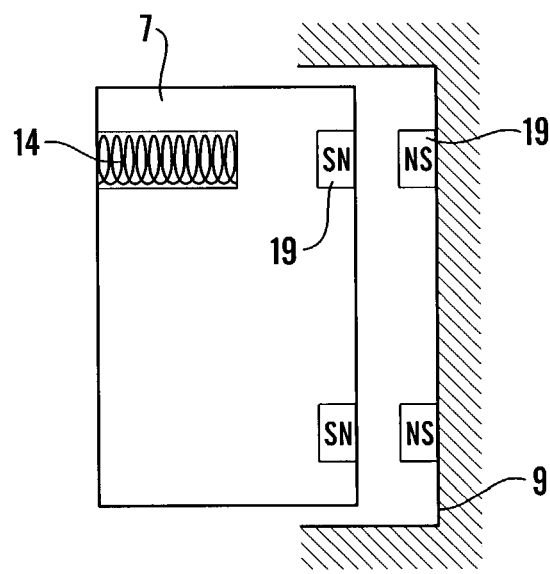
Figure 12B:
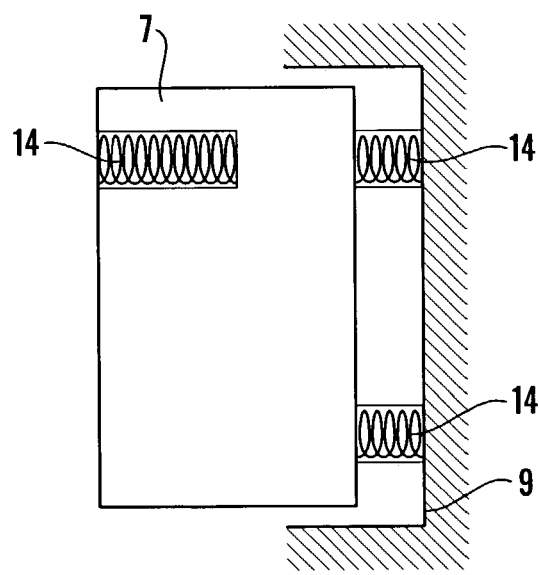

The invention will now be described in greater detail with reference to the attached drawings, where:

FIG. 1 illustrates the different waves propagating from geophones in different locations, FIG. 2 illustrates the principle behind the rupture disc, FIGS. 3a–3d illustrate the functioning of the rupture disc in an embodiment of the invention, FIG. 4 shows a tubing conveyed acoustic source comprising a source module equipped with two one source block according to the invention and linked to the production pipe, FIG. 5 shows a detail of the source module of FIG. 4, FIG. 6 shows the source module of FIG. 3 in a casing, FIG. 7 is a view of an embodiment of the sensor block according to the invention, FIG. 8 shows a sensor module equipped with a sensor block according to the invention, FIG. 9 shows a sensor module in a casing, FIG. 10 shows an array of sensor modules, FIG. 11 shows an example of spacers 16 for use in the source block, FIG. 12a illustrates use of magnetic further devices for urging the block against the casing, FIG. 12b shows clamping devices implemented as springs.

FIG. 1 shows the propagating direction of tube waves.

FIG. 2 shows the principle of operation of a fluid circuit equipped with a rupture disc. A cylinder or housing 1 is divided into two pressure chambers 2 and 3 by means of a rupture disc 4. The rupture disc 4 is held in place by means of a hold down ring 4' and an O-ring 4". The housing 1 is closed on one end by a lid 5", and on the other end by a movable piston 6. The pressure in chamber 3 is lower than the pressure in chamber 2. In the illustrated example chamber 3 contains vacuum while chamber 2 is filled with oil. When the piston is moved towards the inside of the chamber (that is in the direction from chamber 6 towards chamber 3) the pressure in chamber 2 rises until the rupture ring 5 breaks. When this happens the pressure in chamber 2 decreases as the volume is augmented by incorporating chamber 3. If we now connect fluid pipes to chamber 2, it is possible to transmit the pressure (and pressure changes) in chamber 2 to other parts of a fluid circuit.

FIGS. 3a, 3b, 3c and 3d show such a circuit comprising a "trigger" part which causes the rupture disc 4 to break, and a "main" part where this effect is converted into a negative pressure (and a force directed inwards in the module). FIGS. 3a and 3b show a section of the source block 7 before rupture of the rupture disc 4. Release pistons 6 are in an upper position and are connected to a first chamber 2 filled with oil, rupture ring 4 is placed between said first chamber 2 and the second chamber 3. The oil pressure in the first chamber 2 is transmitted to the locking pins 8 because these are fluid connected to chamber 2, the locking pins 8 are forced to project from the source block 7 by means of the pressure in chamber 2.

FIGS. 3c and 3d show the situation after the release pistons 6 are pressed in by increasing the pressure in the fluid which fills the annulus by means of a compressor located in the surface and by so doing the pressure in chamber 2 is increased until rupture disc 4 breaks. The oil from chamber 2 fills chamber 3, pressure drops and the locking pins 8 are pressed inwards towards the rest of the block, and thus do not protrude any longer from the block. The locking pins 8 are "sucked" out of the sockets in the source module. The source block is now free to move towards the casing. The clamping devices (e.g. permanent magnets or springs) will carry the block 7 towards the casing wall and the source is ready for use without significant noise production.

FIG. 4 shows an acoustic source comprising a source module 9 equipped with two source blocks 7 according to the invention and linked to a production pipe 10. The source module 9 comprises apart from source blocks 7, cable clamps 11 for fastening the source module to a production pipe irrespective of the production pipe's dimension. The figure shows also a source termination box 12', cables 12 for connection to a controller unit and for supply of electric power. The source itself is implemented by dishes 13 and the clamping means in this embodiment of the invention are permanent magnets 14. The control of the unit will basically comprise a mechanism for trigging and generation of a sweep signal. The sweep signal can be generated on surface and transmitted down-hole by cable 12 or a down-hole sweep-generator can be included. The source block 7 can be equipped with accelerometers for monitoring of the source performance and the signal from these monitoring devices will be transmitted by cable 12 to surface. Cables 12 to surface are tubing conveyed installed by common techniques used for down-hole sensor installations mounted in the annulus between the production tubing and casing.

FIG. 5 shows a detail of the source module 9 of FIG. 4. In this embodiment, a number of transducer dishes 13 mounted onto a transducer bar 15 forming a reaction mass constitute the source. The permanent magnets 14 or other clamping means are located on the transducer bar.

FIG. 6 shows the source module of FIGS. 4 and 5 in the annulus 17 between a casing 16 and a production pipe 10. As one can see from the figure, the space 17 between source module 9 and casing 16 is reduced, and so is the travel distance of source block 7 that is the distance between a protruding and a non-protruding position. This distance is in a preferred embodiment of the invention between 2 and 6 mm.

FIG. 7 shows a sensor block 7. The same reference number is used for sensor blocks and source blocks since the have the same functionality with regards of the invention. The sensor block 7 comprises permanent magnets 14, that in this embodiment of the invention are cylindrical and are fastened to the sensor block 7. The sensor block in this exemplary embodiment comprises also an accelerometer 20 and a hydrophone (not shown). The sensor block 7 is also equipped with locking devices that in the present embodiment of the invention are implemented as locking pistons or locking pins 8. The locking pins 8 are as mentioned earlier a part of a fluid circuit including a rupture disc 4, and a housing 1 with a first chamber (not shown) containing a fluid under pressure (in this case oil), a second chamber (not shown) containing a fluid at atmospheric pressure (in this case air) and releasing pistons 6. The sensor block is equipped with a pipe 12 comprising conductors for transmission of signals to and from the sensors.

FIG. 8 shows a sensor module 9 equipped with a sensor block 7 according to the invention. The sensor module comprises apart from sensor block 7, a carrier tube 20' adapted for containing a part of a production pipe, a sensor termination box 12', cables 12 for connection to the next level, and signal cables 12".

FIG. 9 shows the sensor module in a casing 16. As one can see from the figure, the space between sensor module 9 and casing 16 is very reduced, and so is the travel distance of sensor block 7. This distance is in a preferred embodiment of the invention between 2 and 6 mm.

FIG. 10 shows an array of sensor modules 9 placed in a casing. This array permits performing seismic acquisition in several depths in the formation.

FIG. 11 shows an example of spacers or extended contact points 18 for use in the block. These are arranged on the block's surface facing the casing. In the drawing they are shown as arranged on top of the magnets, but it is possible to arrange them in other parts of said block surface.

FIG. 12a illustrates use of further permanent magnets 19 between block 7 and module 9. FIG. 8b illustrates use of springs 14 between block 7 and module 9.

As one can see from the above mentioned description, the invention provides a tube conveyed, down-hole seismic acquisition device which can send and receive signals with a minimum of noise, which can safely be activated from the surface by simple means and which does not contain active electrical devices in the releasing/losking mechanism.

The invention claimed is:

1. Tubing conveyed seismic acquisition device, comprising a source and/or a sensor module for placement between a well casing and a production pipe, wherein the source and/or sensor module comprises a block equipped with acoustic transducers and/or sensor devices and clamping devices for clamping the block against the well casing,
    wherein the block comprises a device for locking the block to the module in a first position where the block's surface is flush with the module's surface, a device for releasing the locking device, and a fluid circuit for controlling the operation of the locking and releasing devices,
    and wherein the fluid circuit comprises a first chamber containing a fluid under pressure, a second chamber containing a fluid under a lower pressure, and a rupture disc arranged between the chambers,
    the first chamber being connected to the locking device for controlling its position as a function of the fluid pressure in said first chamber,
    the first chamber being also connected to the releasing device, this device controlling fluid supply and thus pressure in the first chamber,
    the releasing device being adapted to increase pressure in the first chamber until rupture of the rupture disc, which causes the release of the locking device.

2. Acquisition device according to claim 1, wherein the clamping device comprises at least one permanent magnet arranged on the block's surface facing the casing.

3. Acquisition device according to claim 1, wherein the clamping device comprises at least one spring device arranged on the block's surface facing the production pipe.

4. Acquisition device according to claim 1, wherein the clamping device comprises at least one permanent magnet arranged on the block's surface facing the production pipe for cooperation with a repellent permanent magnet arranged on the module.

5. Acquisition device according to claim 1, wherein the locking device in the block comprises locking pins for cooperation with sockets in the module.

6. Acquisition device according to claim 1, further comprising spacers arranged on the surface of the block adapted for apposition against the casing.

7. Acquisition device according to claim 1, wherein a sensor device includes at least one geophone and at least one accelerometer.

8. Acquisition device according to claim 1, wherein the acquisition device is an acoustic source.

9. Acquisition device according to claim 1 wherein the acquisition device is an acoustic sensor.

10. A seismic acquisition device adapted to be conveyed on a tube, comprising a source and/or a sensor module for placement between a well casing and a production pipe, a repellent permanent magnet arranged on the module, wherein the source and/or sensor module comprises a block equipped with an acoustic transducer and/or a sensor device and a clamping device for displacing the block from the module and clamping the block against the well casing, wherein the clamping device comprises at least one permanent magnet arranged on the block's surface facing the production pipe for cooperation with said repellent permanent magnet arranged on the module.

11. A seismic acquisition device adapted to be conveyed on a tube, comprising a source and/or a sensor module for placement between a well casing and a production pipe, wherein the source and/or sensor module comprises a block equipped with an acoustic transducer and/or a sensor device and a clamping device for displacing the block from the module and clamping the block against the well casing, and further comprising spacers arranged on the surface of the block adapted for apposition against the casing.

12. Acquisition device according to claim 10 or 11, wherein the block comprises:

a device for locking the block to the module in a first position where the block's surface is flush with the module's surface, a device for releasing the locking device, and a fluid circuit for controlling the operation of the locking and releasing devices.

* * * * *